INVENTOR
HANS R. A. HANSEN

ATTORNEYS

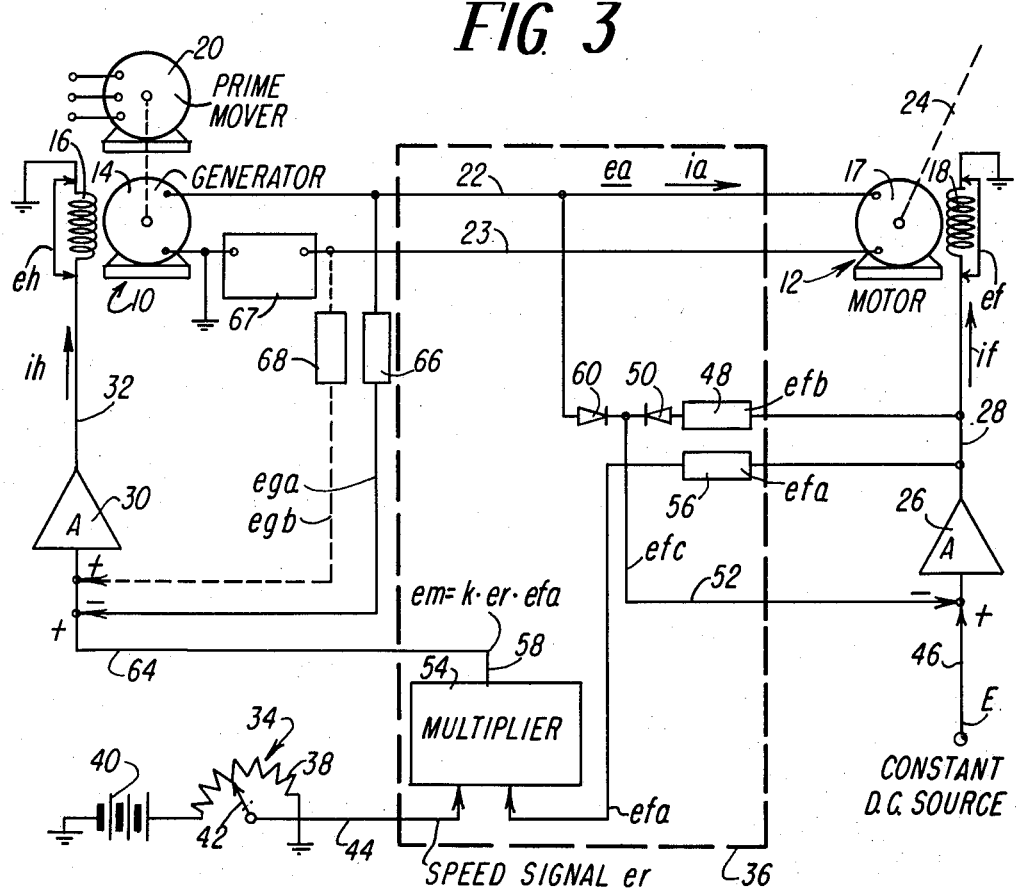

United States Patent Office 3,041,514
Patented June 26, 1962

3,041,514
D.C. ADJUSTABLE SPEED DRIVE
Hans R. A. Hansen, Milwaukee, Wis., assignor to The Louis Allis Co., Milwaukee, Wis., a corporation of Wisconsin
Filed Dec. 13, 1960, Ser. No. 75,586
11 Claims. (Cl. 318—154)

The present invention relates to a direct current adjustable speed drive system and more particularly to a control circuit for effecting a cross-over between the armature voltage speed regulation range and the field voltage speed regulation range of an adjustable speed direct current motor.

One of the most frequently used systems for variable speed drives is the Ward-Leonard system. When a wide speed range is required, it is often economical to use a combination of armature voltage regulation and motor field regulation. Regulation of armature voltage is used in the low speed range while motor field regulation is used in the high speed range. Generally, it is preferred to effect this regulation of armature and field by means of a single control, but it has been found that with such an arrangement, not only is motor speed not linear with control setting, but good "cross-over" is difficult to achieve.

A cross-over circuit with a single speed potentiometer and inherently good linearity is disclosed in application Serial No. 811,499, filed May 6, 1959, now Patent 2,929,975, for a D.C. adjustable speed drive, and assigned to the same assignee as the instant application. However, such a cross-over circuit has one disadvantage in that the speed reference signal provided by the potentiometer is a position signal and not a voltage signal thereby making it difficult to apply controlled acceleration and deceleration and almost impossible to use such a circuit for speed follower systems.

Therefore, it is the principal object of this invention to provide an improved direct current drive system for machinery and the like that is effective for accurately regulating drive speed over a wide range of operating speeds.

Another object of the present invention is to provide an improved control circuit for an adjustable speed direct current drive that effects a smooth and continuous transition between the armature voltage speed regulation range and the field voltage speed regulation range of the D.C. motor.

A further object of this invention is to provide an improved D.C. adjustable speed drive system having inherently good linearity and utilizing only a single speed selecting potentiometer without the necessity of tachometer feedback.

A more specific object of this invention is to provide an improved cross-over circuit for a D.C. adjustable speed drive in which the speed selecting reference signal is a voltage signal rather than a position signal for permitting accurate control of the acceleration and deceleration of the D.C. motor as well as to render such a system suitable for use as a speed follower.

The foregoing objects are accomplished in a preferred embodiment of this invention by providing a control circuit for a generator-motor set characterized as having an armature voltage speed regulation range and motor field speed regulation range, wherein the control circuit includes a generator field amplifier and a motor field amplifier, a source of reference signal for the motor field amplifier, a motor speed selector which produces a speed signal in accordance with the desired speed of the motor, a circuit for modifying this speed voltage in accordance with the output of the motor field amplifier, a feedback circuit connected between the output and the input of the motor field amplifier and an electronic switch which automatically selects either the modified voltage or the feedback voltage to be fed back to the input of the motor field amplifier. The cross-over network operates in two phases; in a first phase the output of the motor field amplifier is maximum and constant and the output of the generator field amplifier is variable in accordance with the setting of the speed selector, and in the second phase the output of the generator field amplifier is at a maximum and constant and the output of the motor field amplifier is variable in accordance with the speed voltage signal as modified. Negative feedback may also be provided to the generator field amplifier from the generator for purposes of maintaining the generator armature output and, accordingly, the motor armature input proportional to the energization provided to the generator field amplifier by the cross-over network. By virtue of this arrangement, the speed of the D.C. motor may be accurately controlled over a wide range.

Further objects and features of the invention pertain to the particular structural arrangement whereby the above-identified and other objects of the invention are obtained.

The invention, both as to its structure and manner of operation, will be better understood by reference to the following specification and drawings, forming a part thereof, wherein:

FIGURE 3 is a schematic representation of an alternate variable speed drive arrangement in accordance with the invention.

Figure 1:
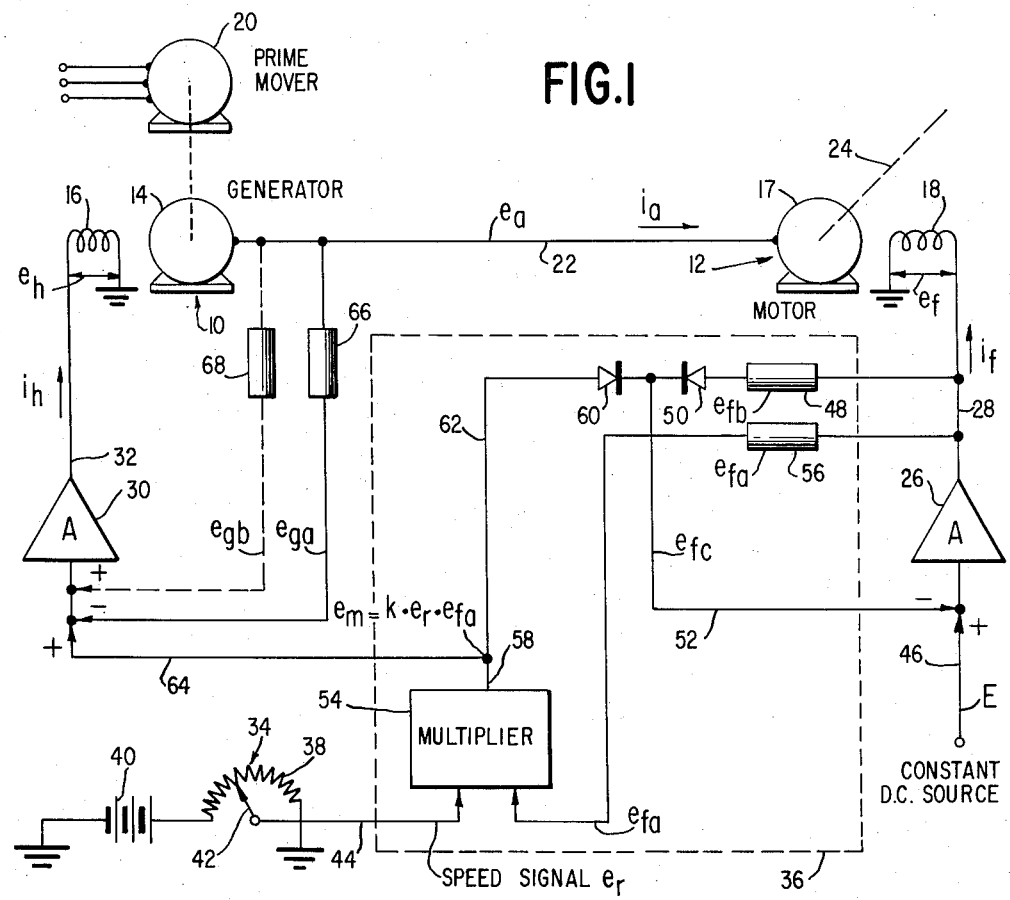
FIGURE 1 is a schematic representation of a variable speed drive arrangement in accordance with the invention.

With reference now to the drawings, there is shown in FIGURE 1 a schematic representation of a preferred drive arrangement in accordance with the invention. In the arrangement there is included a generator-motor set of the Ward-Leonard type including a D.C. generator 10 and a D.C. motor 12. Generator 10 has an armature 14 and field winding 16 and motor 12 has an armature 17 and a field winding 18. A suitable prime mover 20 mechanically drives generator armature 14 at a substantially constant speed. The electrical output of armature 14 is transmitted via conductors 22 and 23 to motor armature 17 which in turn drives an output shaft 24 which may be connected to any desired load. Additionally, there is provided a motor field amplifier 26 for energizing field winding 18 of motor 12 via a conductor 28, a generator field amplifier 30 for energizing field winding 16 of generator 10 via conductor 32, a potentiometer 34 for providing a signal voltage $e_r$ proportional to the desired speed of motor 12, and a cross-over network 36 connected to the output of motor field amplifier 26 for providing a feedback control to amplifier 26 and also for modifying signal $e_r$, which modified signal is applied to the input of generator field amplifier 30 so as to maintain constant the energization of generator field winding 16 when the motor is operating in its field voltage speed regulation range.

Potentiometer 34 consists of a resistance element 38 connected between the terminals of a conventional D.C. source 40, such as a battery, and a wiper arm 42 which acts to tap off a portion of the battery voltage from resistor 38 in accordance with the position of wiper arm 42 relative to resistor 38. In this case, the tapped-off voltage is termed a speed signal $e_r$ and appears on conductor 44.

Any suitable constant direct current source is provided to apply a constant D.C. reference signal via conductor 46 to the input of motor field amplifier 26.

Cross-over network 36 consists of a feedback resistor 48 connected to output conductor 28 of amplifier 26. A diode 50 is connected to the other side of resistor 48 and is poled to provide a feedback path via conductor 52 along which signal $e_{fb}$ may be applied as signal $e_{fc}$ to the input of motor field amplifier 26.

Connected to the output of potentiometer 34 via conductor 44 is a function multiplier 54. Signal $e_r$ is one input or factor applied to multiplier 54 and the other is a control voltage $e_{fa}$ developed by a resistor 56 connected to conductor 28 in the output of motor field amplifier 26. The output of multiplier 54 is a control voltage $e_m$ which is proportional to the product of $e_r$ and $e_{fa}$; i.e., (1) $$e_m = k \cdot e_r \cdot e_{fa}$$

Signal $e_m$ appears on conductor 58 and may be applied as signal $e_{fc}$ via conductor 62 to the diode 60 which in turn is connected via conductor 52 to the input of motor field amplifier 26.

Signal $e_m$ is also applied via conductor 64 to the input of generator field amplifier 30. Also applied as a negative feedback signal to the input of amplifier 30 is a control voltage $e_{ga}$ which is developed across resistor 66 connected between the output of generator armature 14 and the input of amplifier 30. The + and − signs indicate the relative polarities of the various signals.

In this arrangement, there are two phases of operation dependent upon the position of wiper arm 42 relative to resistance element 38 of potentiometer 34. In phase I, where control voltage $e_m$ is less than control voltage $e_{fb}$, diode 50 is forward biased and rendered conducting while diode 60 is reverse biased and rendered nonconducting so that the control voltage $e_{fb}$ becomes equal to the negative feedback voltage $e_{fc}$ which voltage is maintained constant by the regulating of the output of amplifier 26. Consequently, since the output voltage $e_f$ of field amplifier 26 is maintained constant, the energization of motor field winding 18 is also maintained constant.

In phase II, where control voltage $e_m$ is greater than control voltage $e_{fb}$, diode 60 is now forward biased and conducting while diode 50 is reverse biased and nonconducting so that negative feedback voltage $e_{fc}$ becomes equal to control voltage $e_m$. Therefore, in phase II, as speed signal $e_r$ increases, control voltage $e_m$ tends to increase, and control voltage $e_{fc}$ also tends to increase. However, since $e_{fc}$ is applied in opposition to the constant reference signal at the input $e_{fc}$ which in turn decreases field amplifier output voltage $e_f$ of amplifier 26 in the manner of a negative feedback signal, amplifier output voltage $e_f$ and the motor field winding energization decrease in proportion to the increase in $e_{fc}$. This decrease is sensed by resistor 56 so as to correspondingly reduce signal $e_{fa}$ which in turn is a component of $e_m$. Since signal $e_m$ is proportional to signal $e_{fa}$, signal $e_m$ is reduced correspondingly so that for any given setting of wiper arm 42 in the phase II range, signal $e_m$ is maintained constant at its cross-over value, i.e., the value at which $e_m$ became equal to $e_{fb}$.

As a matter of convenience, the values of resistors 48 and 66 may be chosen such that when signal $e_m$ equals signal $e_{fb}$ at cross-over, output voltage $e_h$ of generator field amplifier 30 is equal to the rated voltage of the generator field winding and output voltage $e_f$ of motor field amplifier 26 is equal to the rated voltage of the motor field winding.

In operation, the constant D.C. source applies a constant D.C. reference voltage E via conductor 46 to the input of motor field amplifier 26. The output voltage $e_f$ of amplifier 26 appears across motor field winding 18 and produces a current $i_f$ therethrough to provide the field winding energization for motor 12.

Assuming the arrangement operating in phase I, the speed signal voltage $e_r$ tapped off by wiper arm 42 of potentiometer 34 is of such magnitude that the control voltage $e_m$ appearing on conductor 62 is less than the control voltage $e_{fb}$ developed by resistor 48 connected in the output circuit of motor field amplifier 26. Therefore, rectifier 60 is rendered reverse biased and non-conducting whereas rectifier 50 is rendered forward biased and conducting. Consequently, signal $e_m$ is blocked from the input of motor field amplifier 26 and signal $e_{fb}$ becomes the negative feedback signal $e_{fc}$ which is applied to the input of motor field amplifier 26 in opposition to the reference voltage E. Such an arrangement provides a self-regulating effect on motor field amplifier 26 so that its output voltage $e_f$ and, therefore, the energization of field winding 18 remains substantially constant in phase I.

However, let us now look at generator field amplifier 30. Control voltage $e_m$ is applied via conductor 64 to the input of field amplifier 30 whose output voltage $e_h$ appears across generator field winding 16 to produce a field current $i_h$ which provides the field energization for generator 10. Therefore, it can be seen that, as the speed of motor 12 is varied by adjusting wiper arm 42 to in turn vary speed signal $e_r$ and control voltage $e_m$ in the phase I operation, the field winding energization of generator 10 varies proportionately to effect the desired speed control of motor 12.

For example, as signal $e_r$ is increased in phase I, generator field winding voltage $e_h$ increases and the generator armature voltage $e_a$ increases accordingly since generator armature 14 is driven at substantially constant speed by prime mover 20. In addition, feedback resistor 66 connected to generator armature 14 provides a negative feedback voltage $e_{ga}$ to the input of generator field amplifier 30 to maintain armature voltage $e_a$ substantially proportional to the control voltage $e_m$. It is also understood that suitable IR drop compensation may be provided by signal $e_{gb}$ derived by means of the shunt 67 in the armature circuit and the impedance 68 providing positive feedback at the input to field amplifier 30.

In phase II, the system is operating in its motor field regulation range, i.e., the speed of the motor has been increased beyond the point where the field voltage $e_h$ across generator field winding 16 has reached its rated value which is also the cross-over point at which $e_m$ becomes equal to $e_{fb}$. Further increases in speed caused by increases in speed signal $e_r$ tend to increase control voltage $e_m$ to a value larger than $e_{fb}$ so that diode 60 becomes forward biased and conducting whereas diode 50 becomes reverse biased and nonconducting. This in effect makes negative feedback voltage $e_{fc}$ equal to the control voltage $e_m$. Therefore, as voltage $e_m$ tends to increase, voltage $e_{fc}$, acting in opposition to input voltage E, also tends to increase. Consequently, the resultant input signal to amplifier 26 is reduced so that the output voltage $e_f$ of motor field amplifier 26 decreases.

The regulating effect of amplifier 26 in phase II operation to maintain signal $e_{fc}$, and thereby voltage $e_m$, constant is provided by resistor 56 which develops the control voltage $e_{fa}$, a component of control voltage $e_m$. By virtue of the function of multiplier 54, voltage $e_m$ is made directly proportional to $e_{fa}$ and, since $e_{fa}$ reflects or senses the decrease in output voltage $e_f$ due to the increase in feedback signal $e_{fc}$, voltage $e_{fa}$ also decreases and proportionately reduces signal $e_m$ to its value at the cross-over point and maintains it constant at that value. Therefore, it can be seen that as signal $e_r$ is increased to increase the speed of motor 12, control voltage $e_m$ remains constant due to the regulating effect of motor field amplifier 26 and control voltage $e_{fa}$ and, consequently, generator field winding voltage $e_h$ and generator armature voltage $e_a$ remains constant. In addition, because of the tendency of feedback signal $e_{fc}$ to increase the regulating effect of motor field amplifier 26, output voltage $e_f$ is reduced. Therefore, the energization of motor field winding 18 also decreases so that, with constant motor armature voltage and decreasing motor field excitation, the speed S of motor 12 is increased in accordance with the increase in speed signal $e_r$.

In the phase I operation, it can be seen that since the motor field amplifier output voltage $e_f$ is maintained constant, control voltage $e_{fa}$ is also maintained constant and, therefore, voltage $e_m$ and motor speed S remain proportional to speed signal $e_r$.

In phase II, when signal $e_r$ is increased so that voltage $e_m$ is greater than voltage $e_{fb}$, the operation of diodes 50 and 60 of the static switch forming the cross-over network render voltage $e_{fc}$ equal to voltage $e_m$, and the regulating effect of motor field amplifier 26 tends to maintain voltage $e_m$ constant which in turn maintains generator and motor armature excitation $e_a$ constant.

Therefore, since (1) $$e_m = k \cdot e_r \cdot e_{fa}$$

we find that (2) $$e_r \cdot e_{fa} = \text{constant}$$

or (3) $$e_r = \frac{\text{constant}}{e_{fa}}$$

neglecting saturation in motor 12 we also have:

(4) $$S = \text{constant} \cdot \frac{e_n}{e_{fa}}$$

where S is the speed of the D.C. motor 12, and since $e_a$ is a constant, we have:

(5) $$S = \frac{\text{constant}}{e_{fa}}$$

In other words, in phase II operation, from Equation 5 speed S of D.C. motor 12 is controlled by the motor field excitation which is directly proportional to field winding voltage $e_f$ and thereby to the control voltage $e_{fa}$. However, as seen from Equation 2, $e_{fa}$ is inversely proportional to signal $e_r$. Therefore, motor speed S is directly proportional to speed signal $e_r$ in phase II as well as in phase I.

Figure 2:
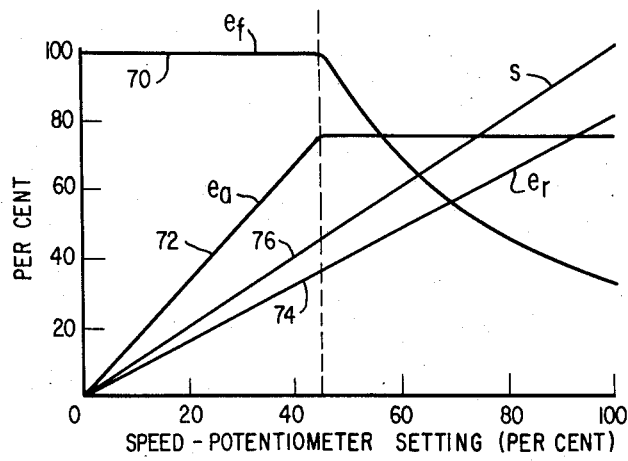
FIGURE 2 is a chart showing the operational characteristics of a D.C. motor controlled in accordance with the drive arrangement of FIGURE 1.

A graph showing the operating characteristic of D.C. motor 12 in both speed ranges is shown in FIGURE 2. It can be seen then that in phase I operation, curve 70 representing $e_f$, the motor field winding energization is maintained constant while armature excitation $e_a$ represented by curve 72 increases proportionately with increases in the speed signal voltage $e_r$ represented by curve 74 to cause in turn a proportionate increase in motor speed S as represented by curve 76. In phase II operation, curve 72 is a fixed value to indicate that armature excitation $e_a$ is maintained constant; however, curve 70 representing motor field winding energization $e_f$ decreases in a substantially inversely proportional relationship with respect to the increasing speed signal $e_r$ to result in an increase in speed S which is proportional to $e_r$.

Referring to FIGURE 3, there is illustrated another embodiment of the invention. FIGURE 3 is identical to FIGURE 1 with the exception that line 62 leading from the multiplier 54 to the diode 60 appearing in FIGURE 1 is omitted in FIGURE 3 and a line extending from line 22 to the diode 60 is added in FIGURE 3.

The voltage $C_a$ appearing on line 22 is proportional to the voltage $C_m$ appearing at the output of the multiplier 54 as can be readily understood from the foregoing description of the invention. Therefore as an alternate scheme, the voltage $C_a$ is applied to the diode 60 in the embodiment of the invention illustrated in FIGURE 3 and the voltage $C_m$ is applied only to the input of amplifier 30. The operation of the embodiment illustrated in FIGURE 3 corresponds to the operation of the embodiment of the invention illustrated in FIGURE 1 and therefore need not be described in detail.

The amplifiers utilized in the speed drive systems illustrated may be either electronic, magnetic or rotating amplidyne or metadyne amplifiers and diodes 50 and 60 may be of any suitable type such as crystal rectifiers or vacuum tubes. In this sense, it is appreciated that variations and modifications may be made in the arrangements shown herein without departing from the scope of the invention.

What is claimed is:

1. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding; a first control amplifier having an output circuit connected to said motor field winding and having an input circuit, means for applying a reference signal to said input circuit, a second control amplifier having an output circuit connected to the generator field winding and having an input circuit, means for providing a speed signal, means for modifying said speed signal in accordance with the output of said first control amplifier to produce a first control signal, means connected in the output circuit of said first control amplifier to produce a second control signal, switch means responsive to said first and second control signals for applying the greater signal to said input circuit of said first control amplifier in opposition to said reference signal in order to control the output thereof to maintain the said greater signal substantially constant, and means for applying said first control signal to said input circuit of said second control amplifier for controlling said generator field excitation in accordance with said speed signal whereby the speed of said motor is regulated through the armature and field winding thereof in accordance with the selected speed signal.

2. The motor generator drive arrangement as defined in claim 1 further comprising means for deriving a third signal proportional to said generator armature excitation and means for applying said third signal in a negative feedback relationship to said second control amplifier for establishing the generator armature voltage proportional to said first control signal whereby the speed of said motor is regulated through the armature and the field winding of said motor in accordance with said speed signal.

3. In a motor generator drive arrangement including a D.C. motor the speed of which is to be controlled in accordance with excitation provided by the armature and field winding thereof and including a generator for controlling the motor armature voltage in accordance with excitation provided in the generator armature by the generator field winding; a control source providing a constant reference signal, a first amplifier for energizing said motor field winding from said constant reference signal, adjustable means for providing a speed signal in accordance with the setting thereof, means for deriving a first control signal in accordnace with the energization of said motor field winding, means for deriving a second control signal in accordance with said speed signal and said first control signal, a second amplifier for energizing said generator field winding in accordance with said second control signal, means for providing a third control signal in accordance with said motor field winding energization, switch means responsive to said second and third control signals for applying the greater of said second and third control signals to said first amplifier in order to control the output thereof to maintain the greater signal substantially constant, and means for applying said second control signal to said second amplifier for controlling the output of said second amplifier and thereby said generator armature excitation in accordance with said speed signal.

4. A motor generator drive arrangement as defined in claim 3 further comprising means for deriving a fourth control signal in accordance with said generator armature excitation, and means for applying said fourth control signal to said second amplifier as a negative feedback signal to maintain said generator field energization and said generator armature excitation substantially proportional to said second control signal.

5. The combination set forth in claim 4 wherein the speed of said generator armature is maintained substantially constant, said adjustable means is a potentiometer and said switch means is of the static type.

6. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding; a control source providing a constant reference signal, a motor field amplifier having an output circuit connected to said motor field winding, means to apply said reference signal to said amplifier, a generator field amplifier having an output circuit connected to said generator field winding, a potentiometer for providing a motor speed signal voltage, means connected in the output circuit of said motor amplifier for producing a first control voltage in accordance with the energization of said motor field winding, means for multiplying together said speed voltage and said first control voltage to produce a second control voltage, means connected in the output circuit of said motor amplifier for producing a third control voltage in accordance with said motor field winding energization, static switch means responsive to said second and third control voltages for applying the greater voltage thereof to said first amplifier in opposition to said reference signal in order to control the output thereof to maintain said greater voltage substantially constant, means to apply said second control voltage to said generator amplifier in order to control the energization of said generator field winding in accordance with said second control voltage, means connected to said generator armature to produce a fourth control voltage, and means to apply said fourth control voltage as a negative feedback signal to said generator amplifier for establishing the generator armature voltage proportional to said second control voltage whereby the speed of said motor is regulated through the armature and the field winding thereof in accordance with said second control voltage.

7. In a motor generator drive arrangement including a D.C. motor the speed of which is to be controlled in accordance with excitation provided by the armature and the field winding thereof and including a generator for controlling the motor armature voltage in accordance with excitation provided in the generator armature by the generator field winding; a control source for providing a constant D.C. reference signal, a first amplifier having an output circuit connected to said motor field winding and an input circuit, means for applying said reference signal to said input circuit, a second amplifier having an output circuit connected to said generator field winding and an input circuit, a potentiometer for producing a voltage speed signal in accordance with which it is desired to control the speed of said motor, first resistance means connected in the output circuit of said amplifier for deriving a first control voltage proportional to said motor field energization, means for multiplying together said speed voltage and said first control voltage to produce a second control voltage, second resistance means connected in the output circuit of said motor field amplifier to derive a third control voltage proportional to said motor field energization, a pair of oppositely poled unidirectional current conducting devices connected back to back between said multiplying means and said second resistance means, and means connected between the juncture of said devices and said input circuit of said first amplifier for applying as a negative feedback signal thereto the greater of said second and third control voltages in order to control the output of said first amplifier to maintain the greater of said second and third control voltages substantially constant, and means connected to said multiplying means for applying said second control voltage to the input circuits of said second amplifier whereby the speed of said motor is regulated through the armature and field winding thereof in accordance with said speed signal.

8. The combination as set forth in claim 7 further comprising third resistance means connected between said generator armature and said input circuit of said second amplifier to derive a fourth control voltage, and means to apply said fourth control voltage as a negative feedback signal to said input circuit of said second amplifier.

9. In a motor field generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding, a control source providing a constant reference signal, a first amplifier for energizing said motor field winding from said constant reference signal, means for providing a speed signal, means for deriving a first control signal in accordance with the energization of said motor field winding, means for providing a second control signal in accordance with said speed signal and said first control signal, a second amplifier for energizing said generator field winding in accordance with said second control signal, means for applying said second control signal to said second amplifier for controlling the output of said second amplifier and thereby said generator armature voltage, means for providing a third control signal in accordance with said motor field winding energization, switch means, means for applying a signal proportional to said third control signal and a signal proportional to said second control signal to said switch means, said switch means response to said last mentioned means for applying the greater of said signals proportional to said third control signal and said second control signal to said first amplifier in order to control the output thereof to maintain the greater signal substantially constant.

10. In a motor generator drive arrangement including a D.C. motor the speed of which is to be controlled in accordance with excitation provided by the armature and the field winding thereof and including a generator for controlling the motor armature voltage in accordance with the excitation provided to the generator armature by the generator field winding, a control source providing a constant reference signal, a first amplifier for energizing said motor field winding from said constant reference signal, means for providing a speed signal, means for deriving a first control signal in accordance with the energization of said motor field winding, means for providing a second control signal in accordance with said speed signal and said first control signal, a second amplifier for energizing said generator field winding in accordance with said second control signal, means for providing a third control signal in accordance with said motor field winding energization, means for providing a fourth control signal in accordance with said generator armature output signal, switch means responsive to said fourth control signal and said third control signal for applying the greater of said fourth control signal and said third control signal to said first amplifier in order to control the output thereof to maintain the greater signal substantially constant, and means for applying said second control signal to said second amplifier for controlling the output of said second amplifier and thereby said generator armature excitation and thereby said fourth control signal in accordance with said speed signal.

11. In a motor generator drive arrangement including a D.C. motor, the speed of which is to be controlled in accordance with excitation provided by the armature and the field winding thereof and including a generator for controlling the motor armature voltage in accordance with the excitation provided in the generator armature by the generator field winding, a control signal for providing a constant D.C. reference signal, a first amplifier having an output circuit connected to said motor field winding and an input circuit connected to said reference signal, a second amplifier having an output circuit connected to said generator field winding and an input circuit, a potentiometer for producing a voltage speed signal in accordance with which it is desired to control the speed of said motor, first resistance means connected in the output circuit of said first amplifier for driving a first control voltage proportional to said motor field energization, means for multiplying together said speed voltage and said first control voltage to produce a second control voltage, second resistance means connected in the output circuit of said motor field amplifier to derive a third control voltage proportional to said motor field energization, means for deriving a fourth control voltage proportional to the armature voltage of said generator, a pair of oppositely poled unidirectional current conducting device connected back to back between said second resistance means and said means for deriving a fourth control voltage proportional to said generator armature voltage, means connected between the juncture of said devices and said input circuit of said first amplifier for applying as a negative feedback signal thereto the greater of said third and said fourth control voltages in order to control the output of said first amplifier to maintain the greater of said third and said fourth control voltages substantially constant and means connected to said multiplying means for applying said second control voltage to the input circuit of said second amplifier whereby the magnitude of said fourth control voltage and the speed of said motor is regulated through the armature and field winding thereof in accordance with the speed signal.

No references cited.